July 6, 1943.　　　G. JAEGER ET AL　　　2,323,753

TRUCK MIXER TRANSMISSION CONTROL

Filed Aug. 3, 1940　　　4 Sheets-Sheet 1

INVENTORS
Gebhard Jaeger.
Clarence I. Bohmer.
Chris Gerst.
BY Corbett + Mahoney
ATTORNEYS July 6, 1943.　　G. JAEGER ET AL　　2,323,753
TRUCK MIXER TRANSMISSION CONTROL
Filed Aug. 3, 1940　　4 Sheets-Sheet 3

INVENTORS
Gebhard Jaeger.
Clarence I. Bohmer.
Chris Gerst.
BY Corbett & Mahoney
ATTORNEYS

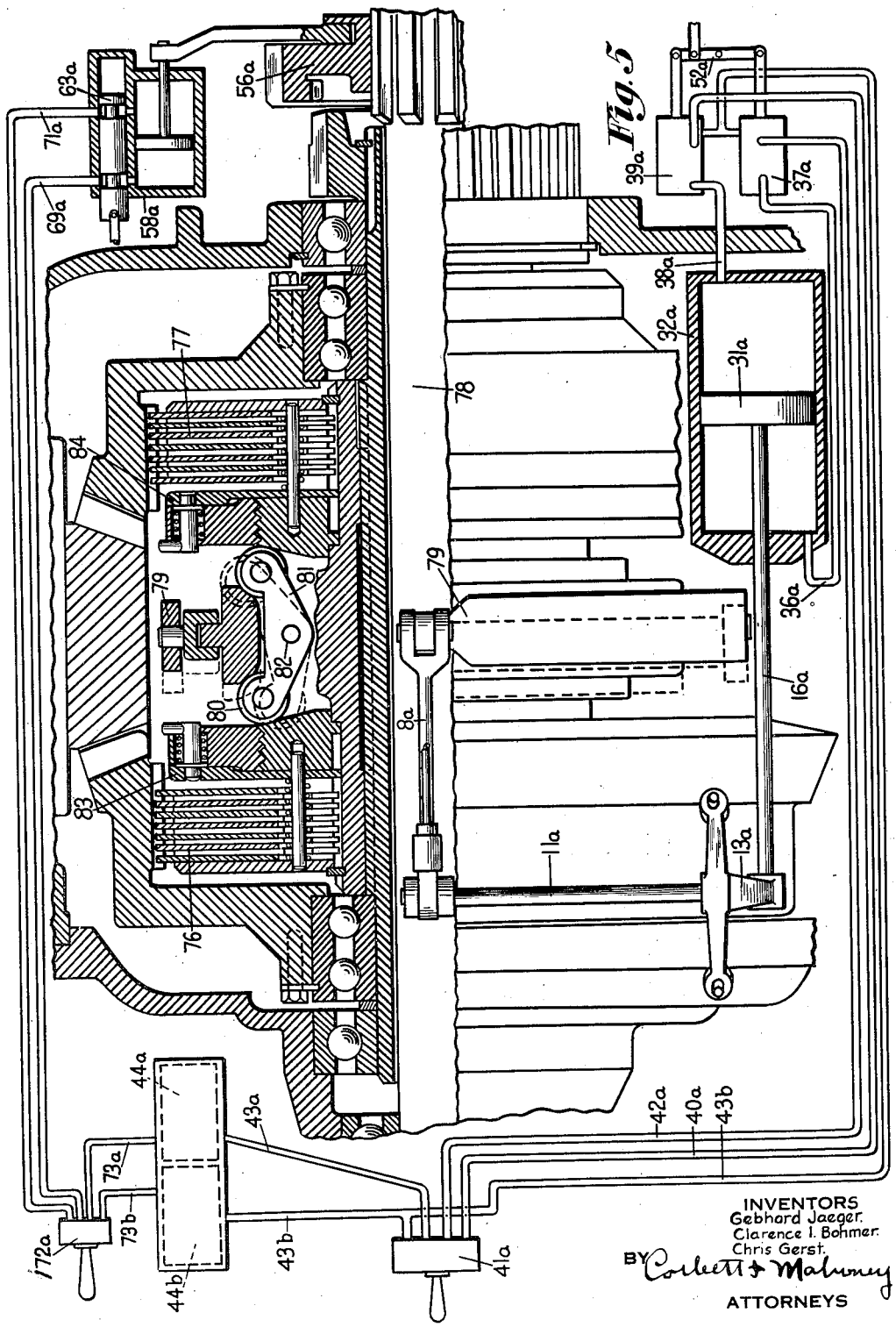

UNITED STATES PATENT OFFICE 2,323,753

TRUCK MIXER TRANSMISSION CONTROL

Gebhard Jaeger and Clarence I. Bohmer, Columbus, Ohio, and Chris Gerst, Detroit, Mich., assignors to The Jaeger Machine Company, Columbus, Ohio, a corporation of Ohio Application August 3, 1940, Serial No. 350,586

8 Claims. (Cl. 192—4)

Our invention relates to a truck mixer transmission control. It has to do, more specifically, with a vacuum type control which is particularly adaptable to a transmission of the type used on truck mixers for transmitting the power from the power unit to the means for rotating the mixing drum.

For example, our control mechanism may be used on a transmission of the type illustrated in the Jaeger & Gerst Patents No. 2,180,469 and No. 2,180,470, which issued November 21, 1939. This type of transmission includes an input shaft and an output shaft with a clutch disposed therebetween for selectively connecting or disconnecting these shafts. The clutch is of such a nature that when it is shifted in one direction from neutral, the output shaft will be driven in a forward direction and when it is shifted in the opposite direction from neutral, the output shaft will be driven in a reverse direction. A brake unit is also associated with the transmission and is so arranged that each time the clutch is shifted into neutral position the brake is applied, and each time the clutch is shifted in either direction away from neutral position the brake is released. This type of transmission also includes a two-speed gear unit disposed between the in-put shaft and the out-put shaft which may be operated to selectively actuate the output shaft at two different speeds.

One of the objects of our invention is to provide a control for a truck mixer transmission which is of such a nature that the transmission may be easily and quickly operated with little effort on the part of the operator, to rotate the mixing drum, which is driven by the out-put shaft of the transmission, in either direction and to drive the drum at a selected speed.

Another object of our invention is to provide a truck mixer transmission control which is of such a nature that the transmission may be controlled from remote points convenient to the operator.

Another object of our invention is to provide a control for a transmission of the type indicated which is vacuum-operated and which is very effective but is of a simple structure so that it can be manufactured at a low cost.

Another object of our invention is to provide a vacuum control for a transmission of the type indicated which is of such a nature that it will be impossible to shift the gears of the two-speed gear unit without first having the clutch in neutral position.

In its preferred form, our invention contemplates the provision of a truck mixer transmission control of the vacuum type which may be operated from points remote from the transmission itself but convenient to the operator. This vacuum control comprises a vacuum-operated cylinder and piston unit associated with the clutch and brake unit of the transmission and a second vacuum-operated cylinder and piston unit associated with the two-speed gear unit of the transmission.

The cylinder and piston unit which controls the clutch is adapted to be operated from a point in the cab of the truck and from a point at the rear of the truck mixer adjacent the discharge door thereof. It is connected to a main control lever which is, in turn, connected to the clutch-operating yoke of the transmission. When the main control lever is swung in one direction away from its initial position, the clutch yoke will engage the clutch to drive the output shaft in a forward direction and when the main control lever is swung in the opposite direction, the clutch yoke will engage the clutch to drive the output shaft in a reverse direction. Movement of the main control lever will be accomplished by creating a vacuum in one end of the cylinder and allowing air to enter the other end of the cylinder. This is accomplished by actuating certain valves disposed in lines connecting the cylinder to a source of vacuum. The main control lever is also connected to the brake unit in such a manner that each time the clutch is released or in neutral position, the brake is applied. Each time the clutch is engaged to drive the output shaft either in a forward or a reverse direction, the brake is released.

The cylinder and piston unit which controls the two-speed gear unit is connected to the shifting lever of the gear unit. A suitable valve is located in the cab of the truck mixer for controlling the vacuum applied to this cylinder and piston unit. However, another control valve is associated with this unit and is connected to the main control lever of the transmission referred to above. This latter valve is of such a nature that it will not permit operation of the cylinder and piston unit for shifting the gears, unless the main control lever is in such position that the clutch is in neutral. This will prevent stripping of the gears.

The preferred embodiment of our invention is illustrated in the accompanying drawings wherein similar characters of reference designate corresponding parts and wherein:

Figure 5 is a view, partly in plan and partly in horizontal section, showing a different type of transmission and showing, more or less diagrammatically, how our vacuum control is applied thereto.

Figure 1:
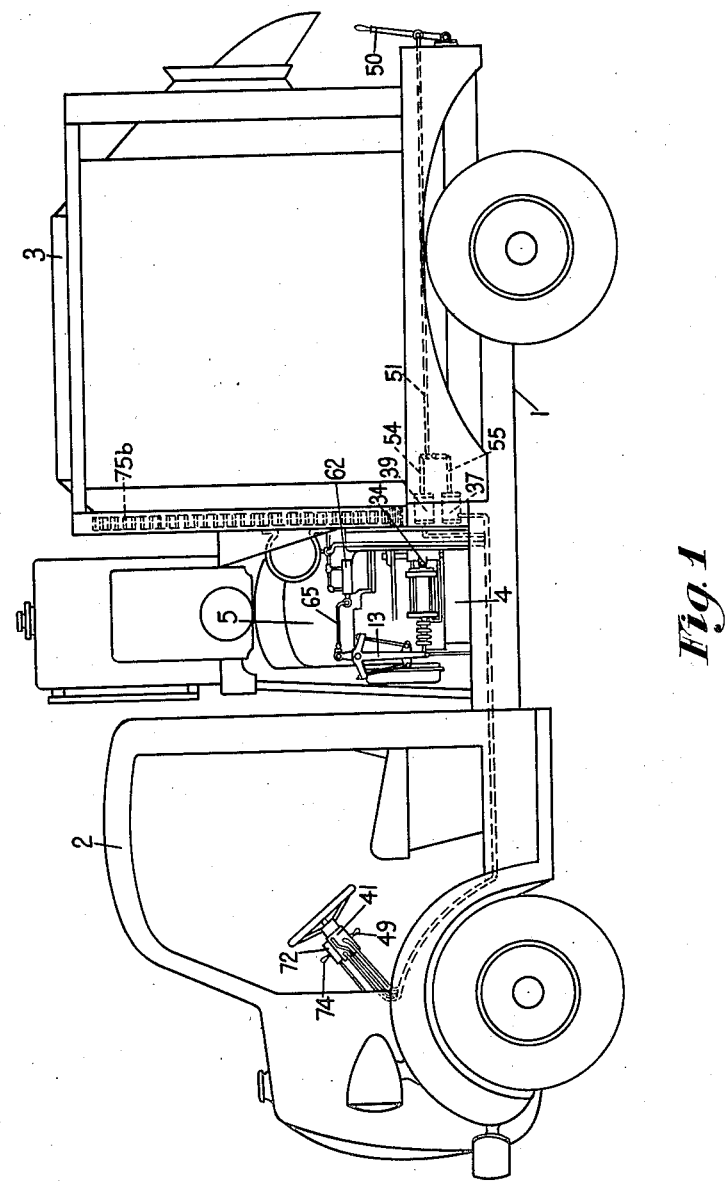
Figure 1 is a side elevation of a truck mixer having our transmission control applied thereto.

With reference to the drawings, and particularly to Figure 1, we have illustrated a truck mixer which includes the chassis 1, the cab 2, and a rotatable mixing drum 3 which is suitably mounted on the chassis and is driven by means of the transmission 4 in the usual manner. The transmission 4 is driven by a power unit 5 of a suitable type.

The transmission 4 may be of the general type disclosed in the patents previously mentioned. However, it is to be understood that this invention is applicable to any transmission which includes a clutch adapted to be shifted in both directions away from a neutral position, a brake unit which is applied when the clutch is in neutral position and is released each time it is shifted away from neutral position, and a multi-speed gear unit.

Figure 2:
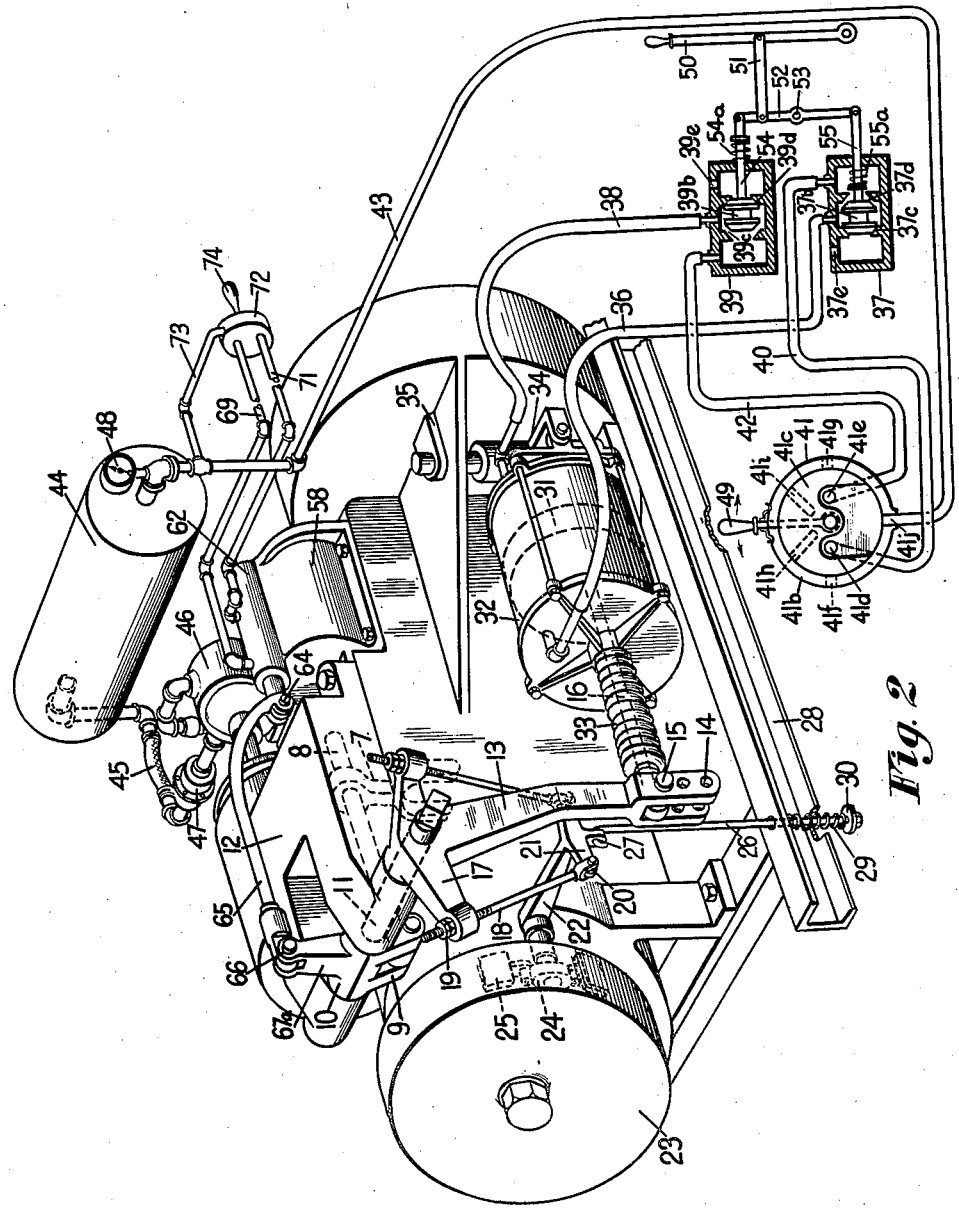
Figure 2 is a perspective view of one type of transmission having our vacuum control associated therewith.
Figure 3:
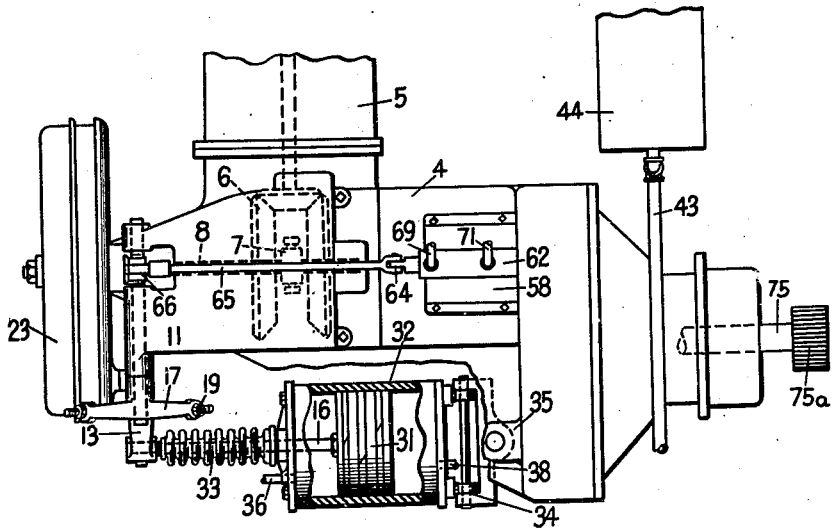
Figure 3 is a plan view, partly broken away, of the structure shown in Figure 2.

The transmission shown includes a clutch, indicated generally by the numeral 6 (Figure 3) which is of the type disclosed in said patents. The clutch is actuated by a yoke 7. This yoke is normally in the neutral position indicated in Figure 4. When it is moved in either direction away from this position, the clutch will be engaged to drive the output shaft of the transmission in one direction. The yoke 7 has its upper end rigidly secured to a shaft 8 (Figure 2). This shaft 8 has its outer end pivotally connected to downwardly extending lugs 9 formed on a split collar 10 which tightly grips a shaft 11 that is rotatably mounted in suitable bearings formed on a member 12 secured to the transmission.

The shaft 11 carries on its outer end the main control lever 13 which has its upper end keyed thereto. This main control lever has a series of pairs of openings 14 formed in a yoke on the lower end thereof and adapted to receive a pivot pin 15 which connects the lever 13 to the outer end of the piston rod 16. At its upper end the lever 13 is provided with oppositely extending arms 17. These arms have openings formed in the outer ends thereof through which the upper ends of rods 18 loosely pass. These rods 18 are threaded at their upper ends and are provided with nuts 19 which prevent the rods from pulling downwardly through the openings. The lower ends of these rods are pivotally connected, as at 20, to the oppositely extending arms 21 formed on the outer end of a brake-applying lever 22 of the brake unit 23. This brake unit may be of the type disclosed in Patent No. 2,180,469. It includes a cam member 24 which is adapted to be rotated by lever 22 to spread the ends of the brake shoe 25 farther apart to apply the brake or to permit the ends to move together to release the brake. A rod 26 has its upper end pivotally connected to the outer end of lever 22, as at 27, and its lower end passes through an opening in a beam 28 which supports the transmission. A spring 29 is provided around the lower end of the rod and its upper end bears against the lower surface of the member 28 while its lower end bears against a washer 30 mounted on the lower end of the rod. This spring will exert a downward pull on the rod 26 which will exert a downward pull on the lever 22 and apply the brake and will also exert a downward pull on the rods 18. Since the pull on the two rods 18 is equal, this will tend to keep the main control lever 13 in neutral position.

The piston rod 16 is connected to the piston 31 which operates in the cylinder 32. When the lever 13 is in neutral position, the piston 31 will be disposed midway between the ends of the cylinder 32. The outer portion of the piston rod 16 is surrounded by a bellows 33 which will protect it from sand and grit and will prevent leakage. The opposite end of the cylinder is completely closed. This end of the cylinder is connected by a universal connection 34 to suitable supports 35 on the transmission.

A line 36 leads from one end of the cylinder 32 to a valve 37. A line 38 leads from the opposite end of the cylinder to a valve 39. These valves may be of usual construction and are illustrated more or less diagrammatically. A line 40 leads from the valve 37 to a main control valve 41. A line 42 leads from the valve 39 to the valve 41. A vacuum line 43 leads from the valve 41 to a vacuum tank 44. This tank 44 is connected by a line 45 to a vacuum pump 46. A filter 47 is incorporated in the line 45 and a gauge 48 is associated with the line 43. The pump 46 is driven by the transmission.

The valve 41 may be controlled by a lever 49 which is normally held by spring means in neutral position. This valve may be disposed in the cab of the truck, as indicated in Figure 1. The valve 41 is such that it ordinarily connects both of the lines 40 and 42 to the vacuum line 43. However, it may be moved in either direction away from its neutral position to connect either the line 40 or the line 42 to the atmosphere and still maintain connection of the other line to the vacuum line 43. For this purpose the valve may consist of a housing 41b having a member 41c mounted therein for rotation upon movement of lever 49. Ports 41d and 41e are provided in the bottom of the housing 41b and communicate with the lines 40 and 42, respectively. Ports 41f and 41g are provided in the side wall of the housing 41b and open to the atmosphere. These ports 41f and 41g are normally closed by portions of the member 41c and the ports 41d and 41e are normally uncovered by said member 41c. Consequently, the vacuum line 43 will normally be in communication with both lines 40 and 42 through port 41j. However, the member 41c is provided with grooves 41h and 41i in the bottom thereof. These grooves are so arranged that when the lever 49 is swung in one direction, the groove 41h connects the port 41d to the port 41f, and at the same time the opening 41d will be covered by the member 41c. Thus, line 40 will be connected to the atmosphere. However, the vacuum port 41j will still be open and the line 43 will be connected to the line 42, through port 41e. The port 41g will still be closed. When the lever 49 is swung in the opposite direction, the groove 41i will connect port 41e to port 41g but will cover the port 41e so that it will not communicate with the port 41j. At the same time the port 41f is still closed and communication between ports 41j and 41d is maintained.

The valve 39 embodies a rod 54 which carries a valve member 39b on its inner end. This valve member 36b is adapted to normally seat on the seat 39d but may seat on seat 39c. It is provided with a port 39e opening to the atmosphere. The value 37 embodies a rod 55 which carries a valve member 37b on its inner end which normally seats on a seat 37c but which may be moved to seat on a seat 37d. Normally the valve 39 serves to connect the lines 38 and 42 together. However, if member 39b is unseated from the seat 39d and seated on the seat 39c, the line 38 will communicate with the atmosphere through the aperture 39e. Thus, the vacuum at one end of the cylinder will be released and the piston 31 will be moved.

The valve 37 operates in a similar manner. Normally the valve serves to connect the lines 36 and 40 together. However, when member 37b is unseated from the seat 37c and is seated on seat 37d, the line 36 will be connected to the atmosphere through the means of aperture 37e. Thus, the piston 31 will be moved in an opposite direction.

It will be apparent that the valve 41 may be operated independently of the valves 37 and 39 to move the piston 31 in either direction. The valves 37 and 39 may be operated independently of the valve 41 but alternately relative to each other to move the piston 31 in opposite directions.

The valves 37 and 39 are operated alternately by means of a pivoted control lever 50 which may be disposed at the rear of the truck mixer, as indicated in Figure 1. This lever 50 is connected by link 51 to a lever 52 which is pivoted to a suitable support, as at 53. The upper end of lever 52 is pivotally connected to the rod 54, while the lower end of lever 52 is pivotally connected to the rod 55. Rod 54 is normally held in such position as to seat member 39b on seat 39d by means of the spring 54a. Rod 55 is normally held in position to seat the member 37b on seat 37c by means of a spring 55a.

Thus, it will be apparent that the transmission may be controlled from a point in the cab of the truck or from a point at the rear of the truck. The piston 31 is normally held in its original position indicated in Figure 2 but may be caused to move in either direction. This will cause the lever 13 to swing in one direction. When the lever 13 swings, one of the arms 17 will swing upwardly while the other will swing downwardly. The arm 17 which swings upwardly will exert a pull on one of the rods 18, while the other rod 18 will merely slide through the opening in the arm 17 which swings downwardly. The upward pull on the rod 18 will exert an upward pull on the outer end of lever 22 causing it to release the brake 23. At the same time, the shaft 11 will be rotated. This will move the shaft or rod 8 axially, causing the clutch yoke 7 to be moved in one direction away from neutral position to apply the clutch. When the main control lever 13 is swung in the opposite direction, the mechanism will function exactly the same, with the exception that the clutch yoke will be moved in an opposite direction to engage the clutch and cause it to drive the output shaft 75 in the opposite direction. As previously indicated, the spring 29 will always tend to maintain the main control lever in neutral position and to apply the brake unit 23. The nuts 19 on the upper ends of rods 18 will limit downward movement of the lever 22. The output shaft 75 carries a pinion 75a (Figure 3) which drives the bull gear 75b (Figure 1) carried by the mixing drum 3, in the usual manner.

Figure 4:
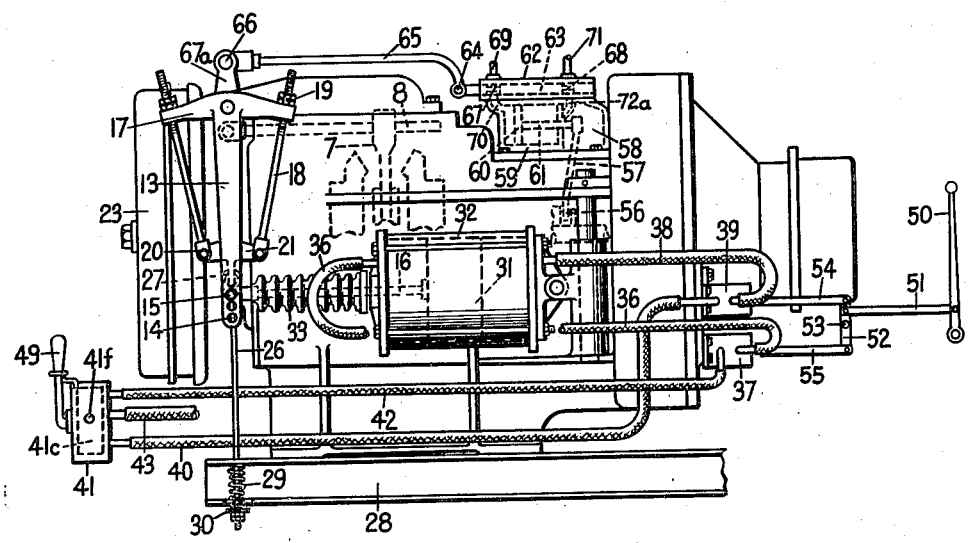
Figure 4 is a side elevation of the structure shown in Figure 2.

As previously indicated, we also provide a vacuum control for the two-speed gear unit of the transmission. This gear unit may be of the type disclosed in the Jaeger & Gerst Patent No. 2,180,469. It is indicated in Figure 4 generally by the numeral 56. It is adapted to be actuated by shifting an arm 57 in opposite directions.

For controlling this gear unit, we provide a vacuum-operated cylinder and piston unit 58. As shown in Figure 4, this unit comprises a cylinder 59 having a movable piston 60 disposed therein. This piston carries a piston rod 61 which is connected to the upper end of the arm 57. By applying vacuum to the opposite sides of the piston 60, the arm 57 will be moved in opposite directions to actuate the two-speed gear unit.

It is important to prevent shifting of the gears until the main control lever 13 is in such a position that the clutch is in neutral. For this purpose we provide the following structure. Mounted on the cylinder and piston unit 58 is a cylindrical valve housing 62. This valve housing has a piston valve 63 disposed therein. One end of this piston valve is pivotally connected, as at 64, to the end of a link 65. The opposite end of this link 65 is pivotally connected, as at 66, to an upstanding lug 67a formed on the split collar 10 which is mounted on the shaft 11. The piston valve 63 is provided with annular chambers 67 and 68 adjacent the ends thereof. When the lever 13 is in its initial position, the chamber 67 connects line 69 to a passage 70 leading into one end of cylinder 59. The annular chamber 68 will similarly connect the line 71 to the passage 72a connected to the opposite end of cylinder 59. The lines 69 and 71 are connected to a control valve 72 which is disposed in the cab of the truck, as indicated in Figure 1. The valve 72 is connected by a line 73 to the vacuum line 43. The valve 72 may be of a type similar to valve 41 and may be actuated by means of a lever 74. In one position, the valve will connect line 71 to line 73 and open line 69 to the atmosphere. In the other position, it will connect line 69 to line 73 and open line 71 to the atmosphere. Thus, by operating valve 72, vacuum will be applied to one end of the cylinder 59 while atmospheric air pressure will be applied to the other end of the cylinder. Thus, by controlling valve 72, the change-speed gear unit may be actuated.

The gear unit can only be shifted as long as the lever 13 is in its initial position illustrated in Figure 2 and, consequently, the clutch is in neutral. At this time the output shaft 75 of the transmission, with which the gear unit is associated, will not be rotated. However, when the lever 13 is swung in either direction, the piston valve 63 will be moved longitudinally of the cylinder 62 and will interrupt communication between line 69 and passage 70 and line 71 and passage 72a. Then, even though the valve 72 is actuated, the cylinder and piston unit 58 will not be actuated and, consequently, the lever 57 will not be shifted.

In Figure 5, we have illustrated how our transmission control can be applied to a transmission of a somewhat different type. This transmission, as before, includes a clutch unit which embodies a multiple disk type clutch 76 and a multiple disk type clutch 77, which are associated with an output shaft 78, and are adapted to drive this shaft in opposite directions when they are engaged. It is believed unnecessary to describe this transmission in detail, inasmuch as the details thereof do not form a part of this particular invention. The clutches 76 and 77 are adapted to be alternately engaged by means of a shiftable clutch yoke 79. This yoke 79 is in engagement with pairs of rollers 80, carried on arms 81 which are pivoted to a stationary support, as at 82. The rollers 80, at one side, engage a ring 83 which is adapted to be moved to the left to actuate the clutch 76. The rollers 80, at the opposite side, are adapted to engage the ring 84 which is adapted to be moved to the right to actuate the clutch 77. By moving member 79 in opposite directions, the clutches 76 and 77 will be actuated.

The vacuum control which we provide for this type of transmission is similar to that previously described. The main control lever 13a is provided, as before. This lever 13a is adapted to rotate the shaft 11a, which is connected by a link 8a to the clutch-actuating yoke 79. The lower end of lever 13a is pivotally connected to a piston rod 16a which extends from a piston 31a, disposed in a cylinder 32a. On one end of cylinder 32a is connected by a line 36a to a valve 37a. The other end of the cylinder 32a is connected by a line 38a to a valve 39a. A line 40a connects the valve 39a to a main control valve 41a, which is adapted to be disposed in the cab of the truck. A line 42a connects the valve 37a to the valve 41a. A line 43a connects the valve 41a to the vacuum compartment 44a of a suitable supply tank. The valves 39a and 37a may be operated manually by a lever 52a in the same manner as the valves 37 and 39. The control system thus far described is exactly the same as that previously described. However, instead of allowing atmospheric air to enter into one end of cylinder 32a while vacuum is being applied at the other end, we provide means for actually applying air under pressure thereto. This means includes a line 43b which is connected to a compartment 44b in the tank which contains compressed air. The valve 41a will operate exactly as before, with the exception that instead of connecting the lines 40a and 42a to the atmosphere, at the proper instants, the valve 41a will connect each of these lines to the air pressure line 43b. The valves 37a and 39a will operate exactly as before with the exception that the parts corresponding to parts 37e and 39e will be connected to the air pressure line 43b instead of to the atmosphere. Pressure and vacuum may be applied to the compartments 44a and 44b in any suitable manner.

The control for the two-speed gear unit 56a of this transmission is practically the same as previously described and embodies a cylinder and piston unit 58a, a safety valve 63a and the two lines 69a and 71a are connected to the control valve 72a, which is located in the cab of the truck. The valve 72a is connected by line 73a to the vacuum compartment 44a of the tank.

The valve 72a, in this instance, functions exactly as the valve 72a described before with the exception that instead of connecting the lines 69a and 71a at the proper instants to the atmosphere, each of these lines is connected to a line 73b which runs from the valve 72a to the pressure compartment 44b. The valve 63a will be controlled by the lever 13a.

It will be apparent from the above description that we have provided a vacuum control system for a truck mixer transmission having many advantages. All of the units of the transmission may be controlled from remote points convenient to the operator. The various units may be operated with little effort. The transmission may be actuated to drive the output shaft of the transmission in either direction or to interrupt rotation thereof. It may be operated to drive the output shaft at different speeds. However, the means for changing the speed of the output shaft will not function unless the clutch unit, which controls rotation thereof, is in neutral position.

Various other advantages will be apparent from the preceding description, the drawings and the following claims.

Having thus described our invention, what we claim is:

1. In combination with a transmission having a clutch, a clutch operating member adapted to be moved from a neutral position to a position where it engages the clutch and causes it to drive the output shaft of the transmission in one direction or to a position where it engages the clutch and causes it to drive the said shaft in an opposite direction, said transmission also having a brake unit associated therewith for exerting a braking force on the output shaft whenever the clutch is disengaged, a lever for operating said brake unit, a vacuum operated control mechanism for moving said clutch operating member from neutral position into either of its positions where it engages the clutch and for simultaneously moving the brake control lever to release the brake, said vacuum operated control mechanism comprising a cylinder having a piston therein movable in both directions, a piston rod extending from said piston, a main control lever having one end keyed to a shaft which carries it and its opposite end connected to said piston rod, said shaft being rotatable by said main control lever and being connected to said clutch operating member to move said member, said main control lever having oppositely extending arms adjacent its pivot point, said arms being connected to said brake lever to produce movement thereof upon movement of said main control lever.

2. In combination with a transmission having a clutch, a clutch operating member adapted to be moved from a neutral position to a position where it engages the clutch and causes it to drive the output shaft of the transmission in one direction or to a position where it engages the clutch and causes it to drive the said shaft in an opposite direction, said transmission also having a brake unit associated therewith for exerting a braking force on the output shaft whenever the clutch is disengaged, a lever for operating said brake unit, a vacuum operated control mechanism for moving said clutch operating member from neutral position into either of its positions where it engages the clutch and for simultaneously moving the brake control lever to release the brake, said vacuum operated control mechanism comprising a cylinder having a piston therein movable in both directions, a piston rod extending from said piston, a main control lever having one end keyed to a shaft which carries it and its opposite end connected to said piston rod, said shaft being rotatable by said main control lever and being connected to said clutch operating member to move said member, said main control lever having oppositely extending arms adjacent its pivot point, each of said arms being connected to said brake control lever by a rod free to slide in one direction relative to said brake arm, and a spring connected to said brake control lever for normally maintaining it in position to apply the brake and for normally maintaining the main control lever in neutral position.

3. In combination with a transmission having an output shaft and means for driving said shaft in a forward or reverse direction or for interrupting the drive to said shaft, said transmission also having a brake unit associated therewith for exerting a braking force on the output shaft when the drive thereto is interrupted, a lever for operating said brake unit, a control member for operating said first-named means and adapted to be moved from a neutral position to a forward drive or reverse drive position, a vacuum-operated unit for moving said control member from neutral position into either of its other positions and for simultaneously moving the brake control lever to release the brake, said vacuum-operated control unit comprising a member movable in both directions, a main control lever having one end keyed to a shaft which carries it and its opposite end connected to said movable member of said vacuum-operated unit, said shaft being rotatable by said main control lever and being connected to said control member to move said member, said main control lever having oppositely extending arms adjacent its pivot point, said arms being connected to said brake lever to produce movement thereof upon movement of said main control lever.

4. In combination with a transmission having an output shaft and means for driving said shaft in a forward or reverse direction or for interrupting the drive to said shaft, said transmission also having a brake unit associated therewith for exerting a braking force on the output shaft when the drive thereto is interrupted, a lever for operating said brake unit, a control member for operating said first-named means and adapted to be moved from a neutral position to a forward drive or reverse drive position, a vacuum-operated unit for moving said control member from neutral position into either of its other positions and for simultaneously moving the brake control lever to release the brake, said vacuum-operated control unit comprising a member movable in both directions, a main control lever having one end keyed to a shaft which carries it and its opposite end connected to said movable member of said vacuum-operated unit, said shaft being rotatable by said main control lever and being connected to said control member to move said member, said main control lever having oppositely extending arms adjacent its pivot point, each of said arms being connected to said brake control lever by a rod free to slide in one direction relative to said arm, and a spring connected to said brake control lever for normally maintaining it in position to apply the brake and for normally maintaining the main control lever in neutral position.

5. In combination with a transmission having a clutch, a clutch operating member adapted to be moved from a neutral position to a position where it engages the clutch and causes it to drive the output shaft of the transmission in one direction or to a position where it engages the clutch and causes it to drive the said shaft in an opposite direction, said transmission also having a brake unit associated therewith for exerting a braking force on the output shaft whenever the clutch is disengaged, a lever for operating said brake unit, a fluid pressure operated control mechanism for moving said clutch operating member from neutral position into either of its positions where it engages the clutch and for simultaneously moving the brake control lever to release the brake, said fluid pressure operated control mechanism comprising a cylinder having a piston therein movable in both directions, a piston rod extending from said piston, a main control lever having one end keyed to a shaft which carries it and its opposite end connected to said piston rod, said shaft being rotatable by said main control lever and being connected to said clutch operating member to move said member, said main control lever having oppositely extending arms adjacent its pivot point, said arms being connected to said brake lever to produce movement thereof upon movement of said main control lever.

6. In combination with a transmission having a clutch, a clutch operating member adapted to be moved from a neutral position to a position where it engages the clutch and causes it to drive the output shaft of the transmission in one direction or to a position where it engages the clutch and causes it to drive the said shaft in an opposite direction, said transmission also having a brake unit associated therewith for exerting a braking force on the output shaft whenever the clutch is disengaged, a lever for operating said brake unit, a fluid pressure operated control mechanism for moving said clutch operating member from neutral position into either of its positions where it engages the clutch and for simultaneously moving the brake control lever to release the brake, said fluid pressure operated control mechanism comprising a cylinder having a piston therein movable in both directions, a piston rod extending from said piston, a main control lever having one end keyed to a shaft which carries it and its opposite end connected to said piston rod, said shaft being rotatable by said main control lever and being connected to said clutch operating member to move said member, said main control lever having oppositely extending arms adjacent its pivot point, each of said arms being connected to said brake control lever by a rod free to slide in one direction relative to said arm, and a spring connected to said brake control lever for normally maintaining it in position to apply the brake and for normally maintaining the main control lever in neutral position.

7. In combination with a transmission having an output shaft and means for driving said shaft in a forward or reverse direction or for interrupting the drive to said shaft, said transmission also having a brake unit associated therewith for exerting a braking force on the output shaft when the drive thereto is interrupted, a lever for operating said brake unit, a control member for operating said first-named means and adapted to be moved from a neutral position to a forward drive or reverse drive position, a fluid pressure operated unit for moving said control member from neutral position into either of its other positions and for simultaneously moving the brake control lever to release the brake, said fluid pressure operated control unit comprising a member movable in both directions, a main control lever having one end keyed to a shaft which carries it and its opposite end connected to said movable member of said fluid pressure operated unit, said shaft being rotatable by said main control lever and being connected to said control member to move said member, said main control lever having oppositely extending arms adjacent its pivot point, said arms being connected to said brake lever to produce movement thereof upon movement of said main control lever.

8. In combination with a transmission having an output shaft and means for driving said shaft in a forward or reverse direction or for interrupting the drive to said shaft, said transmission also having a brake unit associated therewith for exerting a braking force on the output shaft when the drive thereto is interrupted, a lever for operating said brake unit, a control member for operating said first-named means and adapted to be moved from a neutral position to a forward drive or reverse drive position, a fluid pressure operated unit for moving said control member from neutral position into either of its other positions and for simultaneously moving the brake control lever to release the brake, said fluid pressure operated control unit comprising a member movable in both directions, a main control lever having one end keyed to a shaft which carries it and its opposite end connected to said movable member of said fluid pressure operated unit, said shaft being rotatable by said main control lever and being connected to said control member to move said member, said main control lever having oppositely extending arms adjacent its pivot point, each of said arms being connected to said brake control lever by a rod free to slide in one direction relative to said arm, and a spring connected to said brake control lever for normally maintaining it in position to apply the brake and for normally maintaining the main control lever in neutral position.

GEBHARD JAEGER.
CLARENCE I. BOHMER.
CHRIS GERST.

CERTIFICATE OF CORRECTION.

Patent No. 2,323,753.  July 6, 1943.

GEBHARD JAEGER, ET AL.

It is hereby certified that error appears in the printed specification of the above numbered patent requiring correction as follows: Page 3, first column, line 2, for "member 36b" read --member 39b--; page 4, first column, line 24, for "On one end" read --One end--; line 60-63, for "lines 69a and 71a are connected to the control valve 72a, which is located in the cab of the truck. The valve 72a is connected by line 73a to the vacuum compartment 44a of the tank." read --lines 69a and 71a running thereto. These lines 69a and 71a are connected to the control valve 172a, which is located in the cab of the truck. The valve 172a is connected by line 73a to the vacuum compartment 44a of the tank.--; lines 64 and 70, for "72a" read --172a--; and that the said Letters Patent should be read with this correction therein that the same may conform to the record of the case in the Patent Office.

Signed and sealed this 17th day of August, A. D. 1943.

(Seal)  Henry Van Arsdale,
Acting Commissioner of Patents.